S. J. BROWN.
FISH BAIT OR LURE.
APPLICATION FILED OCT. 30, 1918.
1,331,618.  Patented Feb. 24, 1920.
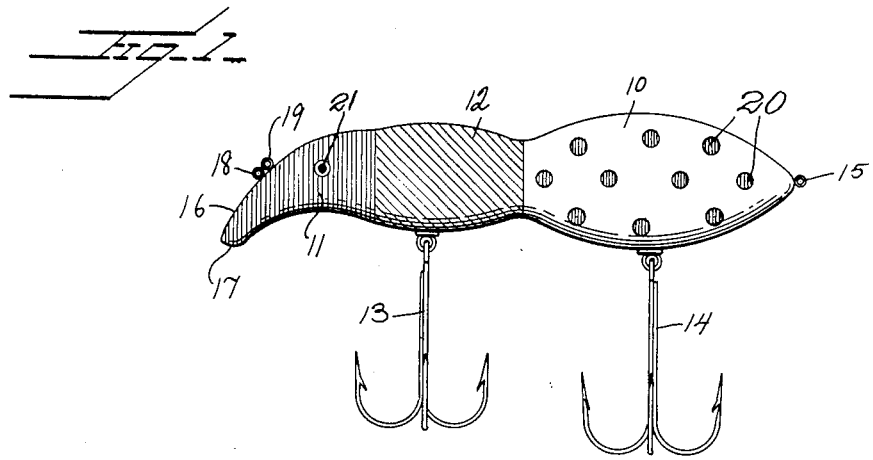
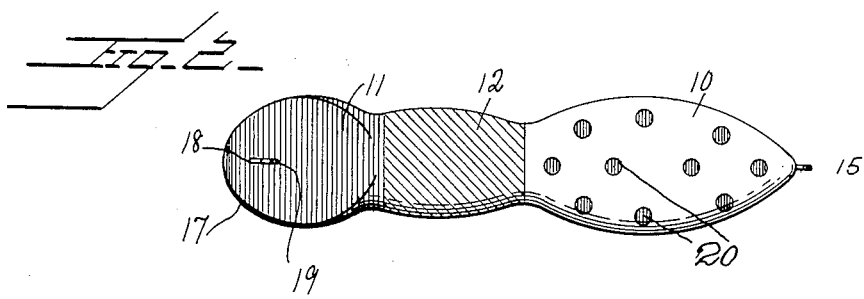
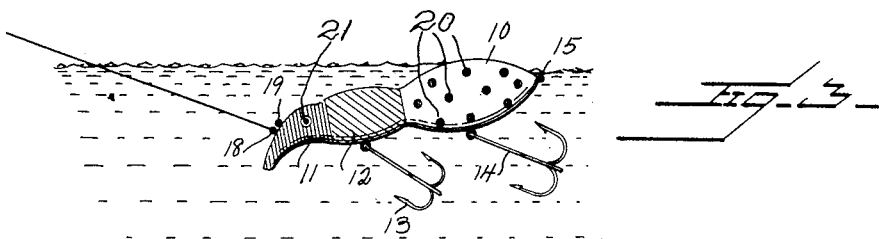
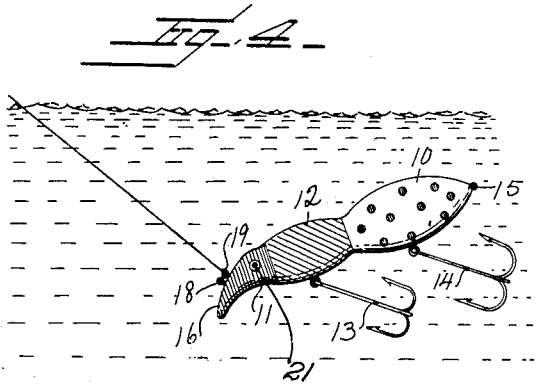
Inventor
S. J. Brown
By Watson E. Coleman
Attorney

UNITED STATES PATENT OFFICE.

SAMUEL J. BROWN, OF OSAKIS, MINNESOTA.

FISH BAIT OR LURE.

1,331,618. Specification of Letters Patent. Patented Feb. 24, 1920.

Application filed October 30, 1918. Serial No. 260,296.

*To all whom it may concern:*

Be it known that I, SAMUEL J. BROWN, a citizen of the United States, residing at Osakis, in the county of Douglas and State of Minnesota, have invented certain new and useful Improvements in Fish Baits or Lures, of which the following is a specification, reference being had to the accompanying drawings.

This invention relates to fish baits or lures of that character wherein the lure comprises a body formed to attract a fish, there being gang hooks attached to the body and depending therefrom.

One object of the invention is to provide a fish lure of the character above indicated which is so constructed that it may be used for casting or trolling, but which may be used either as a surface bait or an underwater bait.

A further object is to provide a lure of this character so constructed that it will have a very natural and life like movement when drawn along the surface of the water at a medium fast speed, the lure being further so formed that, under these circumstances, a portion of the bait or lure will be below the surface of the water while another portion will remain upon or above the surface of the water and will cause a train or wake along its course of travel to thereby imitate the effect of insects or other live bait moving on the surface of the water. This is of particular importance where the lure is being used on still water.

A further object is to provide a lure which is so constructed that it may be attached to the line in such a manner that it will be caused to dive beneath the surface of the water and will stay at a certain angle with relation to the surface of the water when it is drawn along at a moderate speed, the body of the bait being so formed as to cause the lure to operate from side to side, to thereby secure a life like movement to the bait.

A further object is to provide a lure or bait of a relatively elongated form that will not obstruct the action of the gangs of hooks, but will improve the action of the forward gang of hooks, and in this connection to so form the body that the movement of the bait when drawn through the water, either fast or slow will not throw the gang hooks out of their proper position, the gangs of hooks taking such position that they will simulate the legs of an insect.

Another object is to so form the head of the bait that it will act, when the bait is drawn through the water rapidly, to cause a downward movement of the bait and submerge the bait and to provide a body which is somewhat egg shaped and relatively large and joined to the head by a neck having a relatively small diameter causing the water to act on the bait in such manner that the bait will oscillate or jerk from side to side.

Other objects will appear in the course of the following description.

My invention is illustrated in the accompany drawings, wherein:—

Figure 1 is a side elevation of a fish lure constructed in accordance with my invention;

Fig. 2 is a top plan view thereof; and

Figs. 3 and 4 are elevations illustrating the action of the lure under two different circumstances.

Referring to these figures, it will be seen that my improved lure comprises a body 10, which has generally the form of an elongated ovoid, a head 11 and a slightly bulbous neck 12 whose greatest diameter is smaller than the greatest diameter of the body 10. To the neck is loosely attached the forward gang of hooks 13 and to the body, at its middle, is loosely attached the rear gang of hooks 14. These hooks are attached to eyes permitting the gangs to swing freely in any direction. To the rear end of the body is attached an eye 15 whereto a line may be connected, whereby the lure may be drawn backward through the water, under certain circumstances.

The head 11 is somewhat wider than the greatest width of the neck 12 and the upper face of the head extends downward and forward as at 16 so as to form a downwardly and forwardly extending plane, the rear portion of the upper face of the head being slightly rounded from its junction with the neck to the plane 16. The under face of the head is rounded downward and forward and the extremity 17 is slightly rounded both laterally and forwardly. Preferably the head is brilliantly colored, as for instance deep red, or any other color may be used, and preferably two spots 21 are marked or otherwise indicated on the head, these spots simulating the eyes of the insect which the bait or lure is supposed to represent. The eye 15 is disposed in alinement with the axis of the lure and at the opposite end of the axis of the lure there is disposed the eye 18 and slightly above it the eye 19. The eye 18 is for the attachment of a line where the lure is worked in relatively shallow water while the eye 19 is for the attachment of the line when the lure is to be used in relatively deep water.

As illustrated the body 10 is given a certain color with highly contrasting spots 20 while the neck is given somewhat of a neutral tint. It is obvious, however, that other colors and markings may be used. The eyes 18 and 19 are disposed slightly above the downwardly inclined plane 16, that is, the upper end of this inclined plane so that as the lure is drawn through the water the pressure of water upon the inclined face 16 will have a tendency to raise the rear portion of the body, the angle thus given to it depending upon the degree of this pressure and the point of attachment of the line to the head 11. If the line is attached to the eye 19 the lure will tend to dive quite deeply, whereas if it is attached to the eye 18, there will be less leverage exerted by the plane surface and the lure will dive less deeply.

As the lure is drawn through the water, the hooks 13 and 14 will swing rearward and, under these circumstances, they will simulate the legs or swimming apparatus of an animal. It will be noted that when the lure is drawn through the water, the rear hooks 14 extend beyond the body. The head and neck 11 and 12 are made smaller in diameter than the body 10, so as to give the body 10 a greater buoyancy than the head and neck. This makes the lure successful as a surface trailer. When used as an underwater bait, as illustrated in Fig. 4, the lure has a tendency to dive downward and then bob up which is particularly attractive to fish as it gives an effect as if the imaginary insect, minnow or bait was starting to dive to the bottom to escape. When used as an under water bait, the body 10 acts as a governor limiting the bobbing or jerking effect of the bait and causing a very life like movement of the bait, which is, of course, of particular importance.

The body, that is, the portion 10, from its junction with the neck 12 to its rearward extremity, acts as a governor, by holding the bait from too great lateral motion and does not allow the bait to oscillate laterally through too great an angle, and thus the hooks 13 and 14 stay in their proper places and do not swing from one side to another so as to alarm the fish or scare them away. If the body were made smaller in diameter than the head and neck, pressure of the water against the body would not be strong enough to cause a life like movement. The neck 12 is made large in the middle so that it will be sufficiently strong and is tapered back to the body so as to give the body 10 more of a curve so that the pressure of the body against the water will cause a life like movement of the bait. The neck is contracted toward the head so that the head can be made sufficiently small and be more attractive to the fish.

If a line be attached to the eye 15 then the bait may be used as a surface bait and will toss in different directions. This is because of the curved under face of the head 11 which tends to throw the head upward. Where the bait is drawn slowly through the water, as for instance when trolling from a slow-going motor boat, the bait will not go very deep beneath the surface and when so used will dart from side to side, this being caused by a slight rolling movement given to the bait and then the pressure of the water on the curved surface on the under face of the head will cause it to dart from side to side.

If the lure or bait be drawn very rapidly by means of a cord attached to the eye 15, the tendency of the water pressure on the downwardly curved under face of the head will be to throw the head up and, as a consequence, the body will be thrown downward.

I claim:

A fish lure having an ovoidal body portion, a neck and a head connected by said neck to the body, the head being downwardly and forwardly extended and having downwardly and forwardly inclined upper and lower deflecting surfaces extending below the lowest portion of the neck, and line attaching means mounted on the head and on the rear extremity of the body and on the line of the axis of said body and head, the under side of the neck merging into the under side of the head.

In testimony whereof I hereunto affix my signature.

SAMUEL J. BROWN